(12) United States Patent
Melnyk et al.

(10) Patent No.: US 6,590,659 B2
(45) Date of Patent: Jul. 8, 2003

(54) CABLE IDENTIFIER APPARATUS AND METHOD

(76) Inventors: Ivan Melnyk, 604 Cottonwood Ave., Coquitlam, BC (CA), V3J 2S4; John Kidder, 1749 Trafalgar Road, Vancouver, BC (CA), V6K 3R ( * ) Notice: Subject to any disclaimer, the term of this patent is extended or adjusted under 35 U.S.C. 154(b) by 266 days.

(21) Appl. No.: 09/801,820

(22) Filed: Mar. 9, 2001

(65) Prior Publication Data

US 2002/0126286 A1 Sep. 12, 2002

(51) Int. Cl.[7] ................................................. G01J 3/51
(52) U.S. Cl. ........................ 356/406; 356/407; 356/419; 250/226
(58) Field of Search ............................... 356/402, 406, 356/407, 416, 419; 250/226

(56) References Cited

U.S. PATENT DOCUMENTS 4,636,847 A * 1/1987 Magi et al. ................. 382/141
4,731,663 A * 3/1988 Kovalchick et al. ........ 382/165

FOREIGN PATENT DOCUMENTS

DE 3206774 A1 * 9/1983

* cited by examiner

*Primary Examiner*—F. L. Evans

(57) ABSTRACT

The invention is a cable identifier apparatus and a method for fast identification of multi-wire or multi fiber cable. The method is based on illumination of colored buffer of the wire or fiber, registration the reflected light and comparison the measuring data with reference data stored in the memory. The reference data is loaded by measuring the color parameters of the buffer of known identification. The cable identifier apparatus comprises a portable hand-held device with a probe for fixing the buffer in a holder, illuminating the buffer, controlling the incident light and detecting the reflected light with photodetectors. The data is proceed by a microcontroller and an identification symbol of the buffer is displayed in LCD. The variation of the ambient light is compensated by separate measurement of dark and light signals from photodetectors.

22 Claims, 14 Drawing Sheets

132, 134, 135 - Light sources
149, 142, 144 - Reference photodetectors
146, 148, 150 - Measuring photodetectors

CABLE IDENTIFIER APPARATUS AND METHOD

BACKGROUND OF THE INVENTION

1. Field of the invention

This invention in general relates to telecommunication. More particularly, this invention relates to a method for fast identification of colored wires in a multi-wire cable. The wires can be typical electrical wires covered with colored plastic buffers and assembled together in an electrical cable or they can be optical fibers covered with colored plastic buffers and assembled together in an optical fiber cable.

2. State of the Art

Cable identification is a common problem during installation the cable into a telecommunication path. This problem arises with increasing number of the wires in the cable. Conventional methods for cable identification are based on the testing of each individual wires by sending electrical or optical signals in one end of the cable end detecting the corresponding signals at the another end of the cable. This approach is labor intensive because it requires at least two operators to be involved. Besides, a complex specialized technique is required for generating and detecting signals at the both ends of the cable. Also, this technique is expensive and it can only work with certain cables that employ specialized connectors.

The task for cable identification is usually simplified by making the outer layer (buffer) of each wire of different colored plastics. An operator identifies pins and connectors by addressing one color to one connector at the one end of the cable and repeating corresponding sequence of colors and pins at the another end of the cable. This way is acceptable for a limited number of wires in a single cable that can be visually identified. According to a standard TIA-598-A, the number of colors in a cable is limited by 12; they are blue, orange, green, brown, slate (gray), white, red, black, yellow, violet, rose, and aqua. The operator is not able to distinguish more colors in the field conditions. Modern cables, particularly fiber optic cables for local area network (LAN), include more than 100 individual fibers. Secondary buffer of the fibers can be markered by removing the material with a laser, as is disclosed in U.S. Pat. No. 5,111,523 or by adding an extra buffer with a special pattern on it as is disclosed in U.S. Pat. No. 5,796,905. However, the laser ablative technique is too complex and microscopic markers are difficult to recognize in the field because the outer diameter of the buffer can be as small as 0.9 mm.

The conventional colorimetric technique is not acceptable for cable identification due to its complexity and size. A miniature colorimeter disclosed in U.S. Pat. No. 6,157,454 cannot be applied for measuring color of wires in the cable because its light pipe with an axial bore will provide an excess of ambient light leaking around the wire and a flat front aperture. The ambient light is not measured in this calorimeter, and thus, the device will be inaccurate in field conditions with variation of ambient illumination.

SUMMARY OF THE INVENTION

It is therefore an object of the invention to provide a device and method for fast and accurate identification of multi-wire or multi-fiber cable.

It is also an object of the invention to provide a device for fast identification of multi-wire or multi-fiber cable that will be inexpensive and portable.

It is further an object of the invention to provide a device and method for fast identification of multi-wire or multi-fiber cable that can be used in field conditions.

According to the present invention, the colored wires or fibers in the cable are identified by illuminating of each colored plastic buffer with a white light and by detecting reflected light with at least three photodectors with attached color filters that are close to standard R, G and B filters. Measured RGB signals are compared by a microcontroller with reference RGB signals that are stored in the memory. Each reference RGB signal from certain buffer is in accordance with a certain identification number, such as number of pin or connector to be connected to wire or fiber that is covered by this buffer. By comparing measured and reference RGB signals the wire or fiber is recognized including the identification of the proper pin or connector. In another embodiment of the method, the plastic buffer is illuminated with a plurality of light emitting diodes (LED) having different colors, particularly those close to primary colors. Light reflected from the buffer is detected by photodetector or plurality of photodetectors and stored in the microcontroller. The wire or fiber is identified in the same way as in previous embodiment, e.g. by comparison measured and reference data.

For both embodiments, the measured and reference data are taken in two steps. Initially, the dark signals are measured from photodetectors without the turning on light sources. These signals are caused by photodetector noise and ambient illumination. In second step, the light sources are turning on and photodetectors' outputs are measured as light signals. The differences between light and dark signals are actually used for cable discrimination, and thus, the effect of ambient light is minimized.

A number of colors measured by the proposed device exceeds the existing limit of 12 by many folds because with only 8 bit microprocessor the device will have a 24 bit color resolution, or more than 16 million colors. In addition, the device can be inexpensive and portable and very easy to use in field conditions; the identification procedure can be performed by one operator that significantly reduces labor cost.

DETAILED DESCRIPTION OF THE INVENTION

Figure 1A:
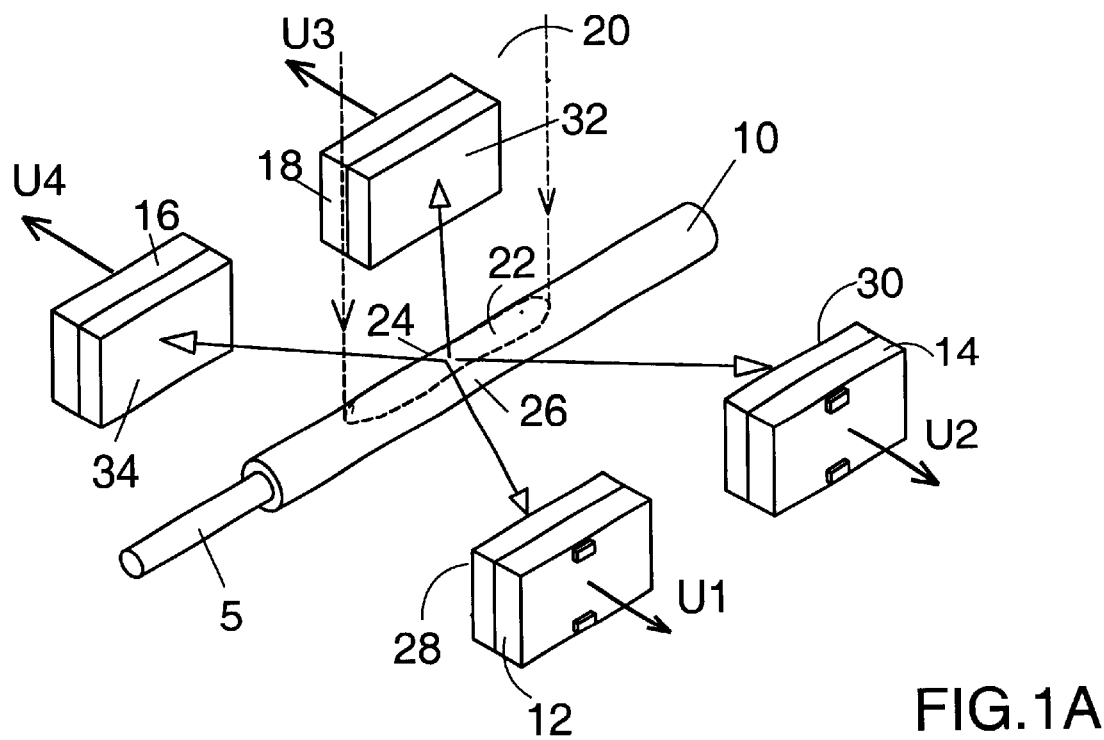
FIG. 1A is a general schematic view of the arrangement describing the method for cable identification of the invention based on illumination of the cable with white light and measuring the reflected light with a plurality of photodetectors associated with color filters.
Figure 1B:
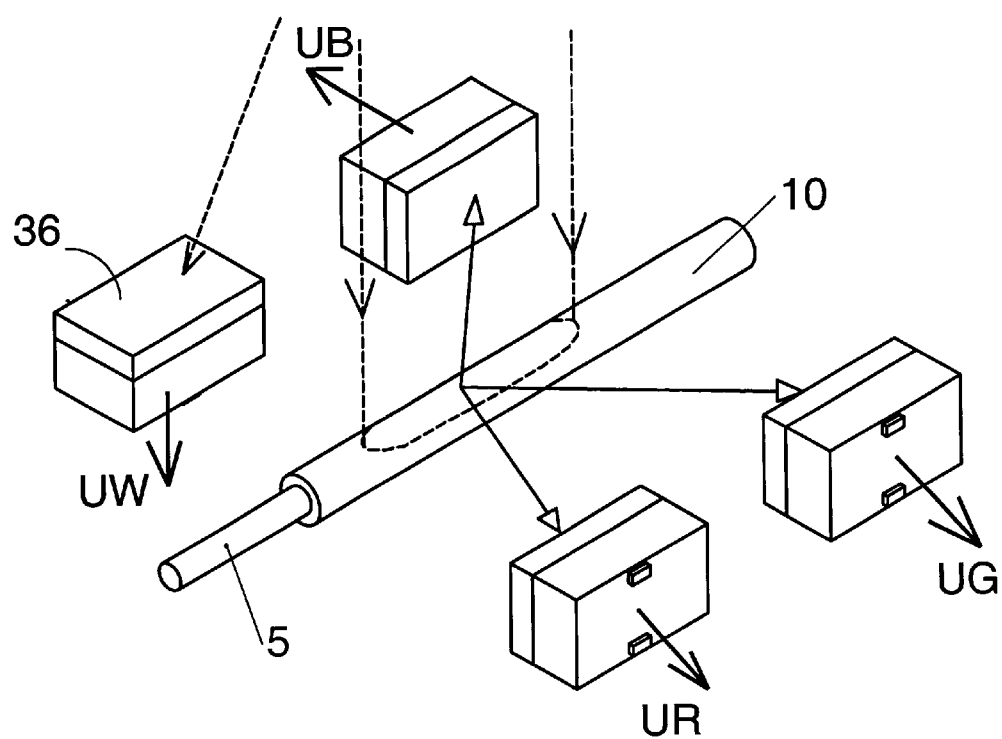
FIG. 1B is the same schematic view as of FIG. 1A with controlling the incident light from a white light source.

According with the present invention, the single wire or fiber in the multi-wire cable is illuminated with the white light as it schematically shown in FIG. 1A. As a routine procedure, the cable must be striped at the end before identification is undertaken. The single wire or fiber (5) is covered with a colored buffer (10) that is steady fixed against the photodetectors (12), (14), (16), and (18). The light (20) from a white light source (not shown) is illuminated an area (22) on the buffer (10). Because of cylindrical shape of the buffer, the light is partially reflected back to the light source; however, most of the light is reflected at both sides (24) and (26) of the buffer where it is collected by the photodetectors. The color composition of the reflected light is determined by filtering the light with color filters (28), (30), (32) and (34) located in front of the photodetectors and by measuring signals U1, U2, U3, U4 from that photodetectors. The number of filters and corresponding them photodetectors can vary. Preferably, the color filters are three standard RGB filters, and signals from photodectors are $U_R$, $U_G$ and $U_B$ as is shown in FIG. 1B. The light intensity of the incident white light may be controlled with a forth photodector (36) that generates the signal $U_W$ which is used for normalization of measured signals.

Figure 2:
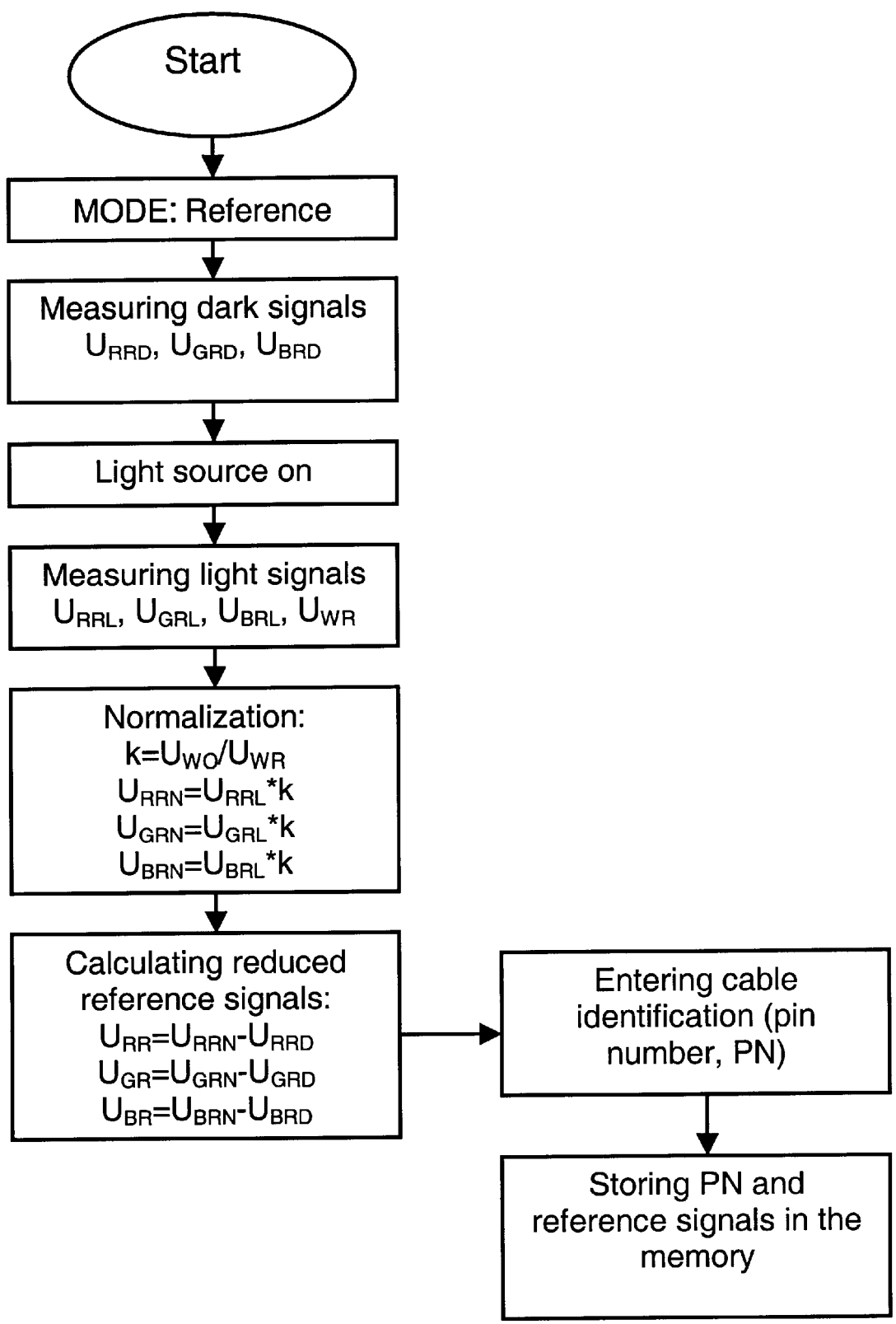
FIG. 2 is a flow chart of the signal processing for reference mode of the invention.

Signals from photodetectors are proceed by signal processing means (not shown) that is preferably based on a microcontroller. The microcontroller compares measured signals $U_{RM}$, $U_{GM}$ and $U_{BM}$ with those reference signals $U_{RR}$, $U_{GR}$ and $U_{BR}$ stored in the memory. Stored signals are loaded in the memory during the data loading procedure. A flow-chart of this procedure is shown in FIG. 2. The data loading procedure is executed when the mode "Reference" is selected. A piece of wire or fiber with the original colored buffer is placed steady against the light source and photodetectors. With selecting mode "Reference", dark signals $U_{RRD}$, $U_{GRD}$ and $U_{BRD}$ from three photodetectors (photodetectors (12), (14), and (16) shown in FIG. 1A) are registered by the microcontroller. After the registration of dark signals, the microcontroller turns on the white light source and a set of light signals $U_{RRL}$, $U_{GRL}$, $U_{BRL}$ from the same photodetectors is registered. Also, the white reference signal, $U_{WR}$, is registered from the forth photodetector (36) that is shown in FIG. 1B. The microcontroller compares the reference signal $U_{WR}$ with the standard basic level of white light $U_{WO}$ which value is loaded as a constant into the memory of the microcontroller. The $U_{WO}$ value is proportional to intensity of the light source under standard laboratory conditions. These conditions include a stabilized ambient temperature that is, preferably, +20° C. The microcontroller executes the ratio, $k=U_{WO}/U_{WR}$, and the signals $U_{RRL}$, $U_{GRL}$, $U_{BRL}$ are normalized by multiplying them by factor k:

$U_{RRN}=U_{RRL} \cdot k$;

$U_{RGN}=U_{RGL} \cdot k$;

$U_{RBN}=U_{RBL} \cdot k$.

Thus, the factor k takes into account possible instability of the light source that occurs with time and changing temperature. The thermal shift can be compensated by the variety of means, however, it is not an object of the present invention.

Finally, the reduced reference RGB signals $U_{RR}$, $U_{GR}$, and $U_{BR}$ are obtained by subtracting the dark signals from the normalized signals:

$U_{RR}=U_{RRN}-U_{RRD}$;

$U_{GR}=U_{RGN}-U_{GRD}$;

$U_{BR}=U_{RBN}-U_{BRD}$.

The operator selects the desire identification number of the wire from the available options and enter this number in the memory. This identification number can be typically a pin number which identifies the number of pin to be coupled with this wire or fiber. The microcontroller stores a set of data for each wire or cable, such as values of signals $U_{RR}$, $U_{GR}$, $U_{BR}$ and a corresponding them pin number, PN.

The loading procedure is repeated until color data from all wires of fibers in the cable are loaded into the memory.

Figure 3:
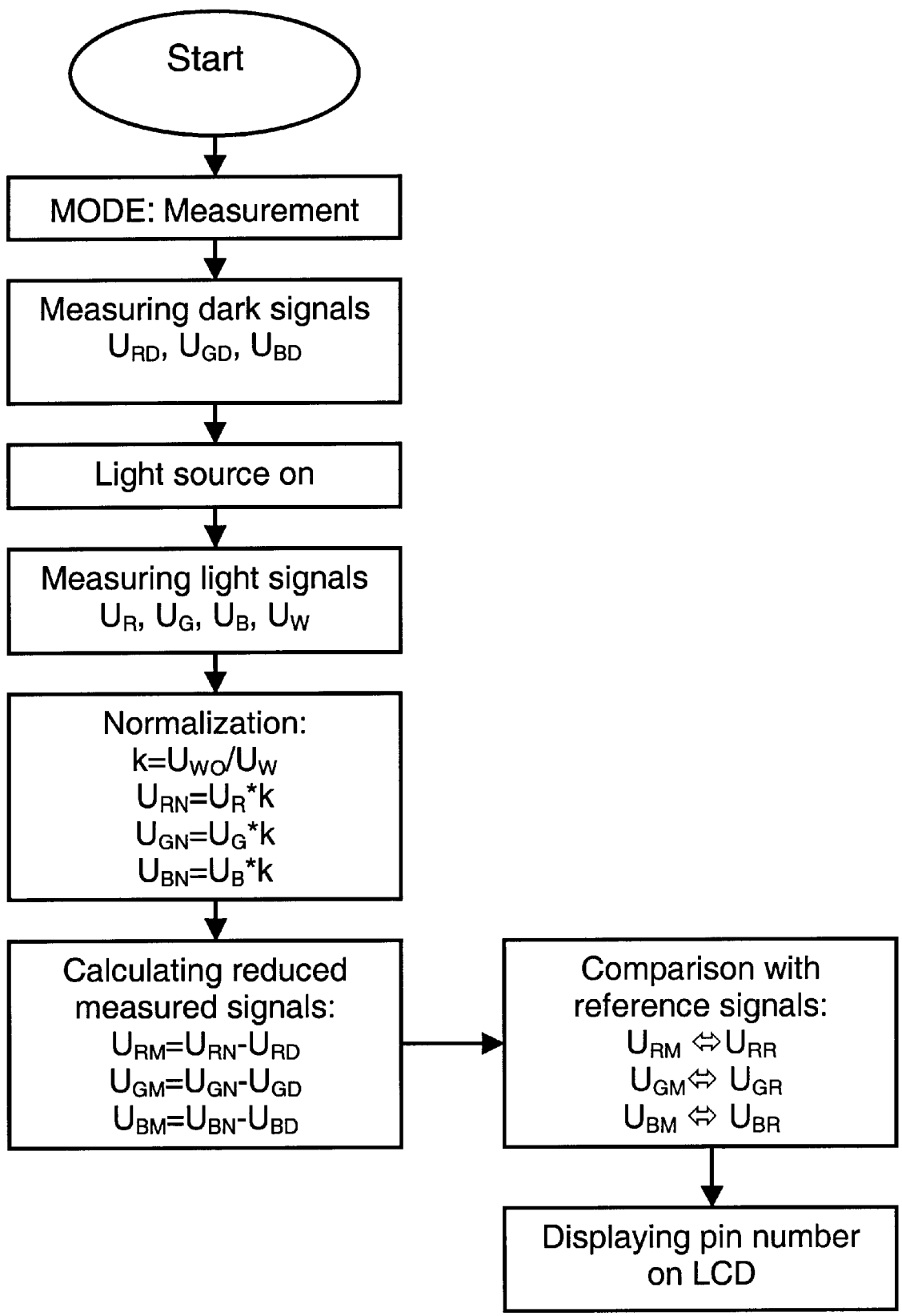
FIG. 3 is a flow chart of the signal processing for measurement mode of the invention.

The flow-chart of the mode "Measurement" is shown in FIG. 3. The checking wire or fiber must be fixed in the same position against the light source and photodetectors as it was done during loading procedure. By powering the processing unit, the dark signals $U_{RD}$, $U_{GD}$, and $U_{BD}$ are detected by the photodetectors and registered by the microcontroller. The microcontroller turns on the light source and three light signals $U_R$, $U_G$, $U_B$, and a white signal $U_W$ are registered from photodetectors described above. The microcontroller normalizes the signals in a similar way as it is done in "Reference" mode by calculating the factor k as a ratio, $k=U_{WO}/U_W$, where $U_{WO}$ is the same constant value, and multiplying the signals $U_R$, $U_G$, $U_B$ by factor k:

$U_{RN}=U_R \cdot k$;

$U_{GN}=U_R \cdot k$;

$U_{BN}=U_R \cdot k$.

The final reduced measured signals are calculated as differences between normalized light signals $U_{RN}$, $U_{GN}$, $U_{BN}$ and dark signals, $U_{RD}$, $U_{GD}$, $U_{BD}$, accordingly:

$U_{RM}=U_{RN}-U_{RD}$;

$U_{GM}=U_{GN}-U_{GD}$;

$U_{BM}=U_{BN}-U_{BD}$.

The microcontroller compares each pair of reduced measured and reference signals, $U_{RM}$ and $U_{RR}$, $U_{GM}$ and $U_{GR}$, $U_{BM}$ and $U_{BR}$, from all stored cable data; and determines the best matching combination. This comparison can be done in a variety of ways including, for instance, the minimum square root difference between reduced measured and reference signals. The best-matched combination of reduced reference signals corresponds to the same color of the measured and referenced buffer. The microcontroller initiates the identification number of the wire or fiber having the same color of the buffer and presents this number on the display. This number is preferably a pin number, PN, that shows the number of pin in the connector to be connected to the identified wire or fiber.

Due to high reproducibility of the color of the plastic buffer the wire or fiber can be exactly identified for any practically reasonable number of wires or fibers in the cable. For example, a 3-bit resolution per channel (that means only 9 separate signals from one photodetector) provides a 9-bit color discrimination for RGB system, or 512 colors. The 3-bit resolution is easy achievable by using common silicone photodetectors and 8-bit microcontroller. Another important feature for practical application is that the process described above is very fast. Signal processing itself takes only few milliseconds including measuring of dark and light signals and comparison the data.

Figure 4A:
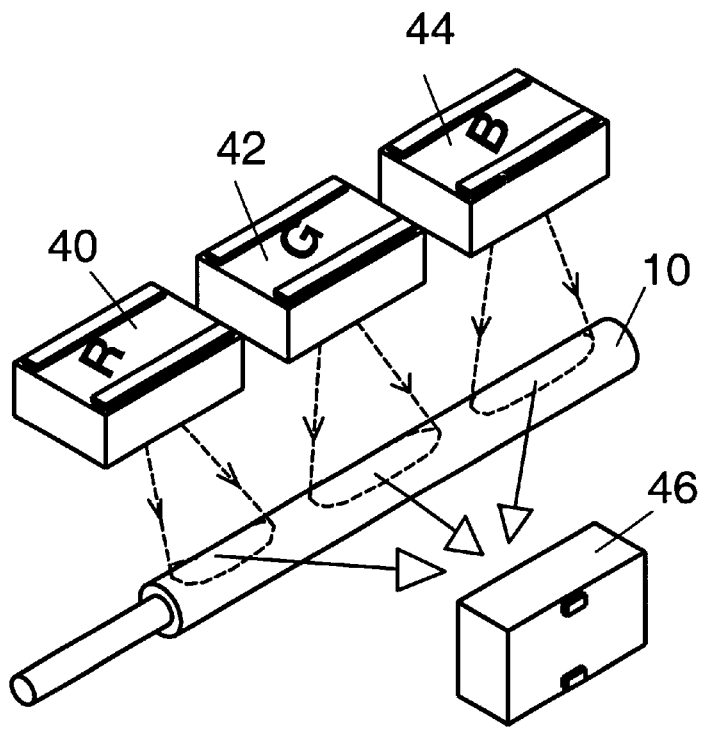
FIG. 4A is a general schematic view of the second embodiment of the invention comprising the illumination of the buffer with a plurality of different light sources and detecting the reflected signal by one measuring photodetector.
Figure 4B:
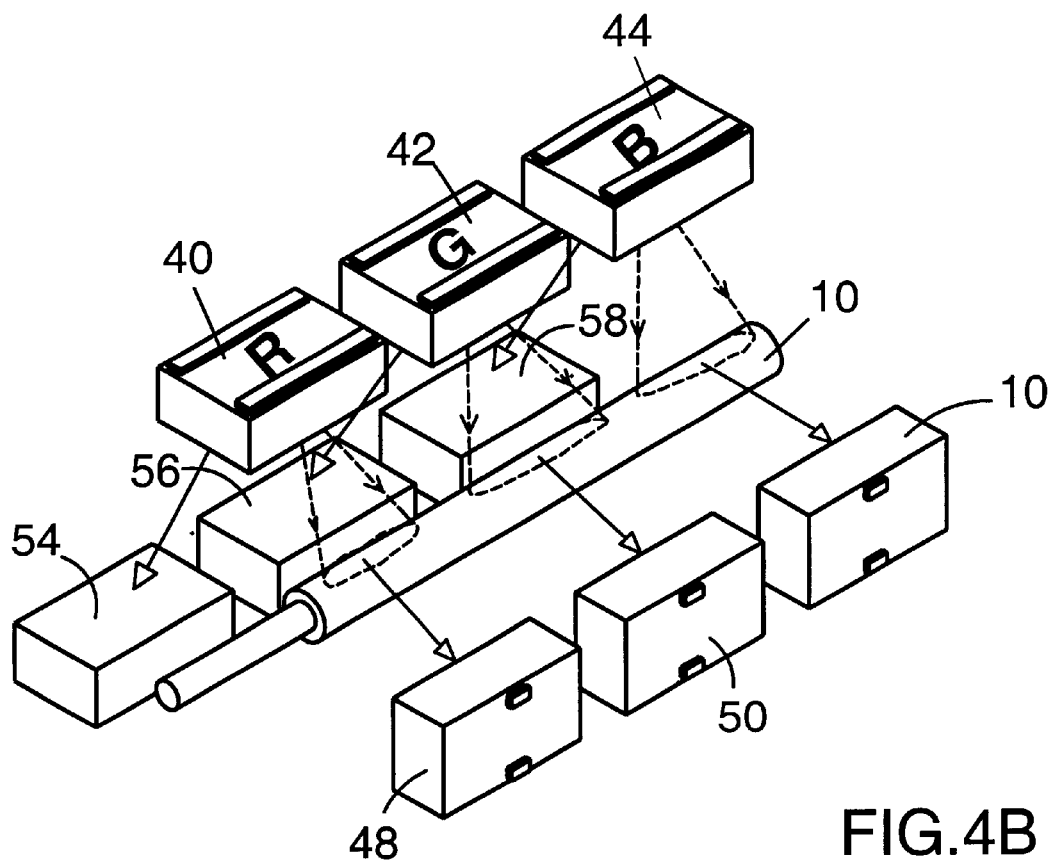
FIG. 4B is another schematic view of the second embodiment of the invention with separation of different light sources, measuring photodetectors and adding reference photodetectors that control incident light from each light source.

The color of the buffer can be identified by its separate illumination with red, green and blue light as is shown in FIG. 4A. The buffer (10) is consequently illuminated by the red (40), green (42) and blue (44) light sources, and reflected light is measured by the photodetector (46). The advantage of this approach is that light is not filtered with color filters, and thus more light is approaching the photodetector. The reflected light can be also detected by three independent photodetectors as is shown in FIG. 4B. Photodetectors (48), (50) and (52) are coupled with the light sources (40), (42), and (44), accordingly. A set of three other photodetectors, (54), (56) and (58) serves for compensation of thermal instability of the light sources in a way as it was described before.

Figure 5:
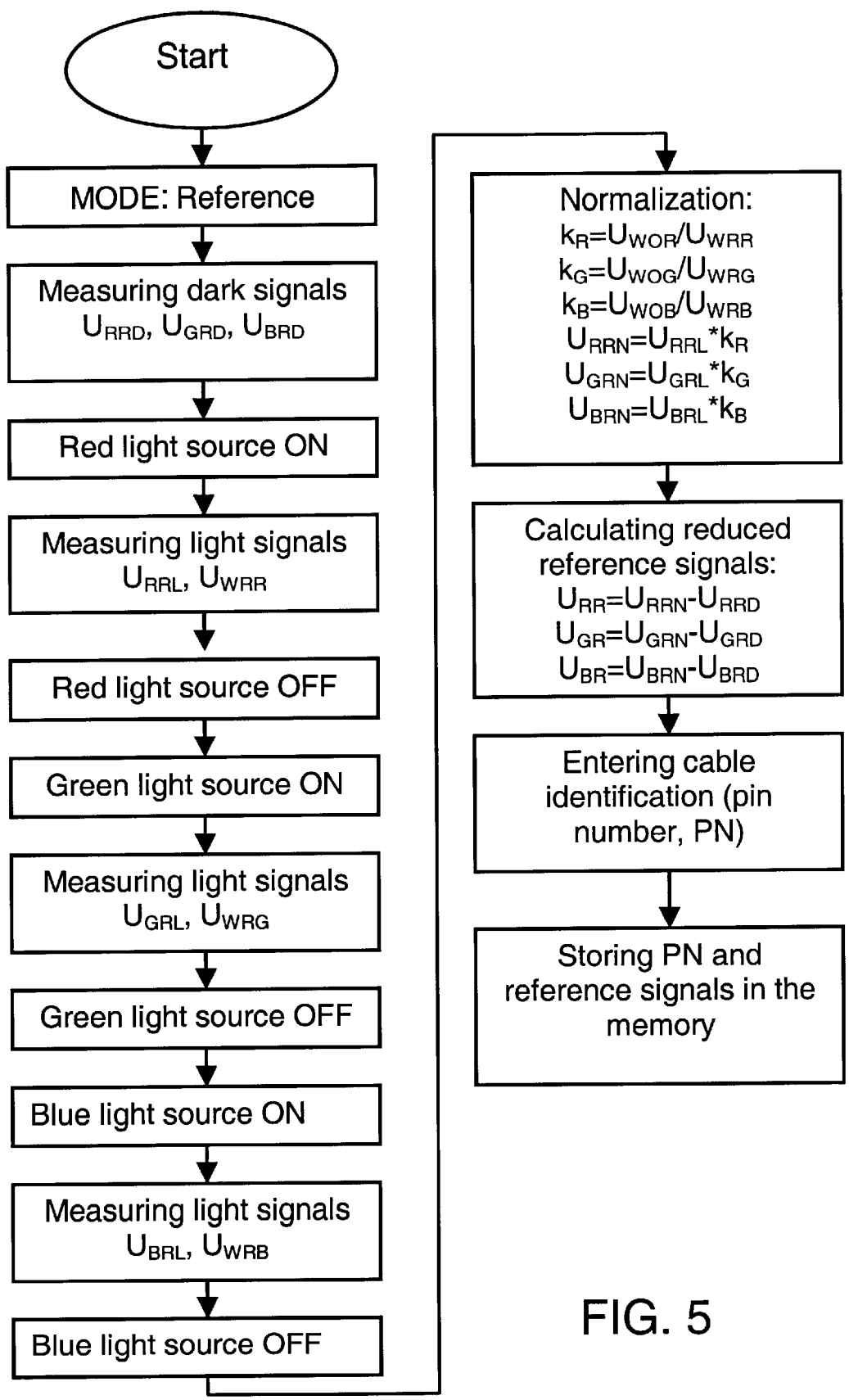
FIG. 5 is a flow chart of the signal processing for reference mode of the second embodiment of the invention.

The method of cable identification using three light sources also include two modes of operation, the first mode is "Reference" and the second mode is "Measurement". The flow-chart of the "Reference" mode is shown in FIG. 5. After wire or fiber has been steady fixed against light sources and photodetectors, the dark signals $U_{RD}$, $U_{GRD}$ and $U_{BRD}$ are measured and stored in the memory of the microcontroller. Then the microcontroller turns on one of the light sources (for example, the red light source) while other two light sources are still kept off. The light signals $U_{RRL}$ and the $U_{WWR}$ are registered and stored in the memory. The signal $U_{RRL}$ is proportional to intensity of the red light reflected from the buffer while the signal $U_{WWR}$ is proportional to intensity of the incident red light. Then the red light source is turned off and the second light source (for example, the green light source) is turned on. The pair of signals, $U_{GRL}$ and $U_{WRG}$, is measured, where $U_{GRL}$ and $U_{WRG}$ are proportional to amount of green light reflected from the buffer and incident green light, respectively. In the same way the microcontroller registers the last pair of signals, $U_{BRL}$ and $U_{WRB}$, from the blue channel. The measured signals are normalized by three normalization factors, $k_R$, $k_G$ and $k_B$:

$k_R = U_{WOR}/U_{WRR}$;
$k_G = U_{WOG}/U_{WRG}$;
$k_B = U_{WOB}/U_{WRB}$, where signals $U_{WOR}$, $U_{WOG}$ and $U_{WOB}$ correspondingly equal to signals $U_{WRR}$, $U_{WRG}$ and $U_{WRB}$ taken in normal laboratory conditions described above.

The normalized reference signals are calculated as products:

$U_{RRN} = U_{RRL} \cdot k_R$;
$U_{GRN} = U_{GRL} \cdot k_G$;
$U_{BRN} = U_{BRL} \cdot k_B$.

The reduced reference signals are calculated as differences between the normalized signals and dark signals:

$U_{RR} = U_{RRN} - U_{RRD}$;
$U_{GR} = U_{RGN} - U_{GRD}$;
$U_{BR} = U_{RBN} - U_{BRD}$.

An identification symbol of the wire or fiber that corresponds to calculated combination of three signals, $U_{RR}$, $U_{GR}$ and $U_{BR}$, is entered to the microcontroller by the operator. The loading of reference data is continued until all wires or fibers from the cable are tested.

Figure 6:
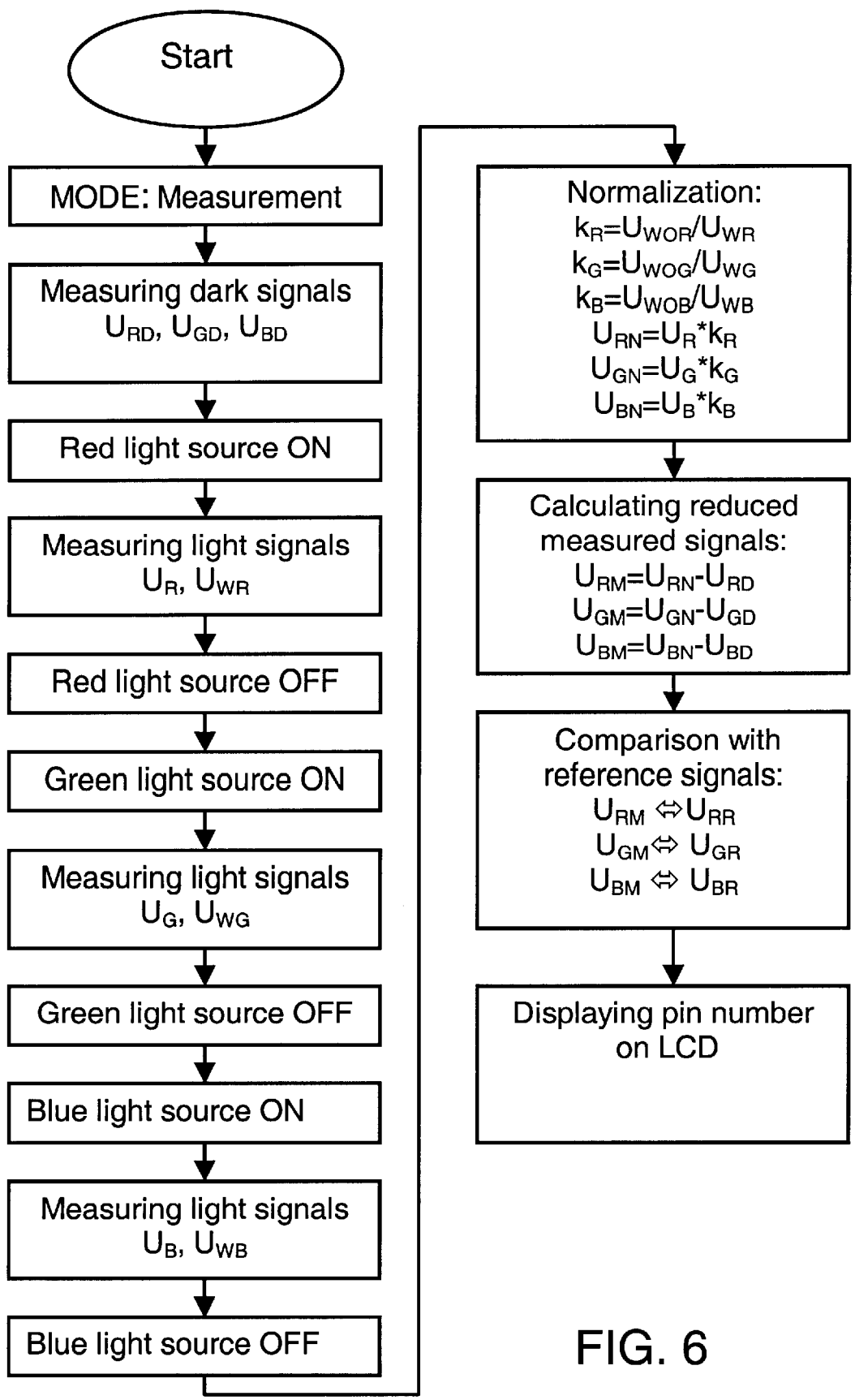
FIG. 6 is a flow chart of the signal processing for measurement mode of the second embodiment of the invention

The flow-chart of the "Measurement" mode is shown in FIG. 6. After the buffer of the wire or fiber is fixed against light sources and photodetectors, the dark signals $U_{RRD}$, $U_{GRD}$ and $U_{BRD}$ and measured. Then the light sources are consequently turned on and the pairs of light signals are measured, $U_R$ and $U_{WR}$, $U_G$ and $U_{WG}$, $U_B$ and $U_{WB}$. Each pair represents a signal proportional to the light reflected from the buffer and a signal that corresponds to the intensity of incident light. The light signals are normalized by normalization factors $k_R$, $k_G$, and $k_B$ for red, green and blue colors, correspondingly:

$k_R = U_{WOR}/U_{WR}$;
$k_G = U_{WOG}/U_{WG}$;
$k_B = U_{WOB}/U_{WB}$.

The normalized measured signals are calculated as products:

$U_{RN} = U_R \cdot k_R$;
$U_{GN} = U_G \cdot k_G$;
$U_{BN} = U_B \cdot k_B$;

and the reduced measured signals are calculated as differences between normalized measured signals and dark signals:

$U_{RM} = U_{RN} - U_{RD}$;
$U_{GM} = U_{GN} - U_{GD}$;
$U_{BM} = U_{BN} - U_{BD}$.

The microcontroller compares a set of measured values $U_{RM}$, $U_{GM}$ and $U_{BM}$ with that stored in the memory and determines the identification number (or pin number, PN) which has the same set of color data $U_{RR}$, $U_{GR}$ and $U_{BR}$ that was loaded during the "Reference" procedure.

Figure 7:
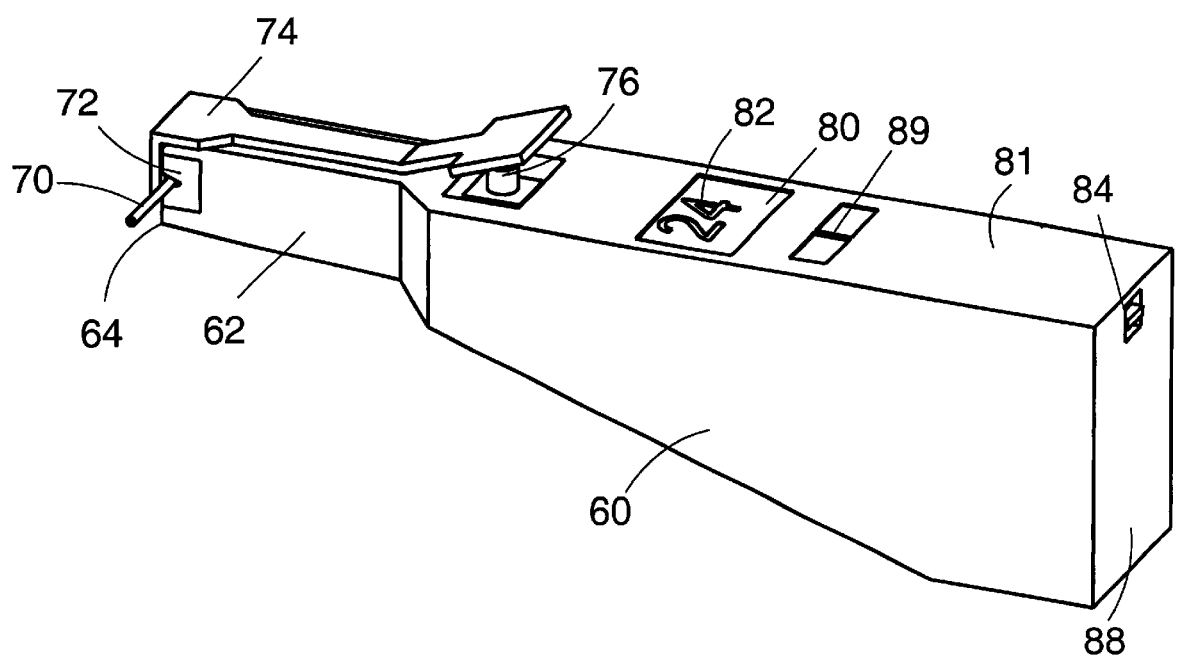
FIG. 7 is a general view of cable identifier of the invention.

An exterior view of the cable identifier according with the present invention is shown in FIG. 7. The identifier is a portable hand-held device that comprises a body (60) and a narrowed probe (62). The probe of the device is applied by its distal tip (64) to a buffer (70) of the wire or fiber. The buffer is steady positioned at the tip (64) by a holder (72) and is fixed by a clamp (74). The clamp is associated with a switch or start button (76). A small LCD display (80) is located on the body, preferably on its front face (81) where the readout (82) can be easy viewed by the operator. A second switch (84) is preferably positioned in the back or proximal side (88) of the body. The switch (84) is a power and mode selection switch. A third switch (89) is preferably located on the front side of the body where it can be easy activated with a finger. This switch is preferably a two-buttons switch; one button is used for selecting the indication (82) during the "Reference" mode whereas another button is used for loading the selected indication into the memory of the microcontroller.

Figure 8:
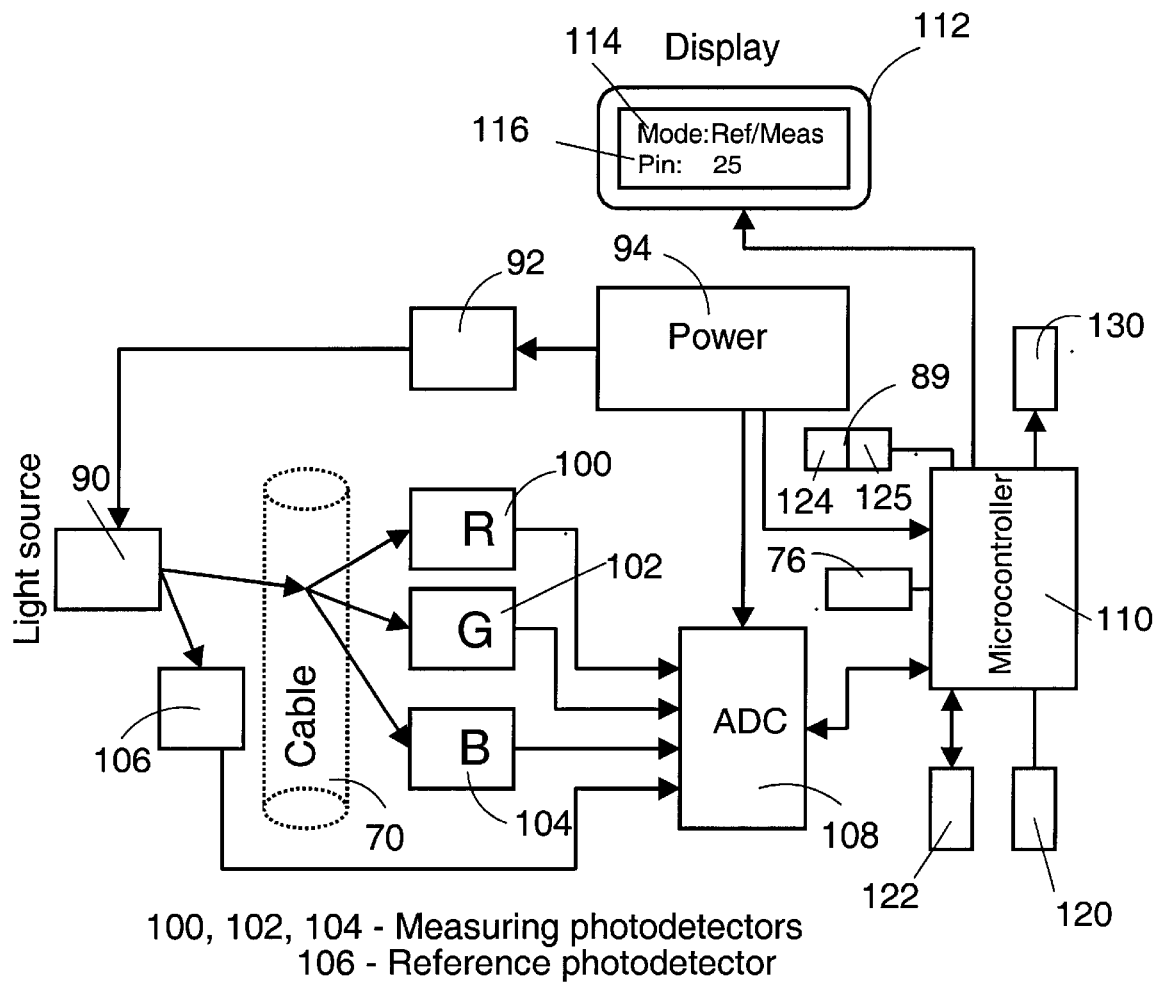
FIG. 8 is an electronic schematic of the cable identifier realizing the method of cable identification presented in FIG. 1B.

A schematic of the preferred embodiment of the electronic unit of the device is shown in FIG. 8. A source of white light (90) is powered through a driver (92) from a power supply (94). The source of white light is preferably a white emitting diode (LED) with operating voltage from 3 to 5 volts. The light reflected from the colored buffer (70) is collected by three photodetectors (100), (102) and (104) having one of the RGB filters. The intensity of white light is measured by a reference photodetector (106) that does not have any filter. The photodetectors are preferably silicone photodiodes or phototransistors. The outputs of the photodetectors are connected to an analog-to digital converter (108) that is connected to a microcontroller (110). The microcontroller indicates the results of the measurement on a liquid-crystal-display (LCD) (112). The indication results preferably include two lines of data, the status mode ("Reference" or "Measurement") (114) and the pin number, PN, (116). The mode can be chosen by a switch (120) that is connected to the microcontroller (110). The second switch (76) is a start button switch witch is associated with the clamp (74) shown in FIG. 7. The switch is pressed by the clamp when the buffer (70) is inserted into the holder (72); the clamp releases the switch when the buffer is fixed in the holder. The released switch triggers the microcontroller which activates the light source, the photodetectors and the analog-to-digital converter. The measured color data and reference data are stored in the memory (122) associated with the microcontroller. The third switch (89) is connected to the microcontroller. It includes two buttons (124) and (125); one button is used for changing the identification number (116) during the "Reference" mode: the second button is used for loading the selected identification number into the memory. A speaker (130) may be associated with the microcontroller. It accompanies the end of each measurement and powering the device as well. The power supply (94) is preferably a rechargeable battery, thus an optional connector to the battery may be used for recharging.

The operation of the electronic schematic is provided as it is disclosed in FIG. 2 and FIG. 3. The schematic preferably operates in a pulse mode because it provides more efficient powering of LED and less total power consumption. It will be obvious to one skilled in the art that the pulse mode may include different number of pulses in order to achieve better accuracy.

Figure 9:
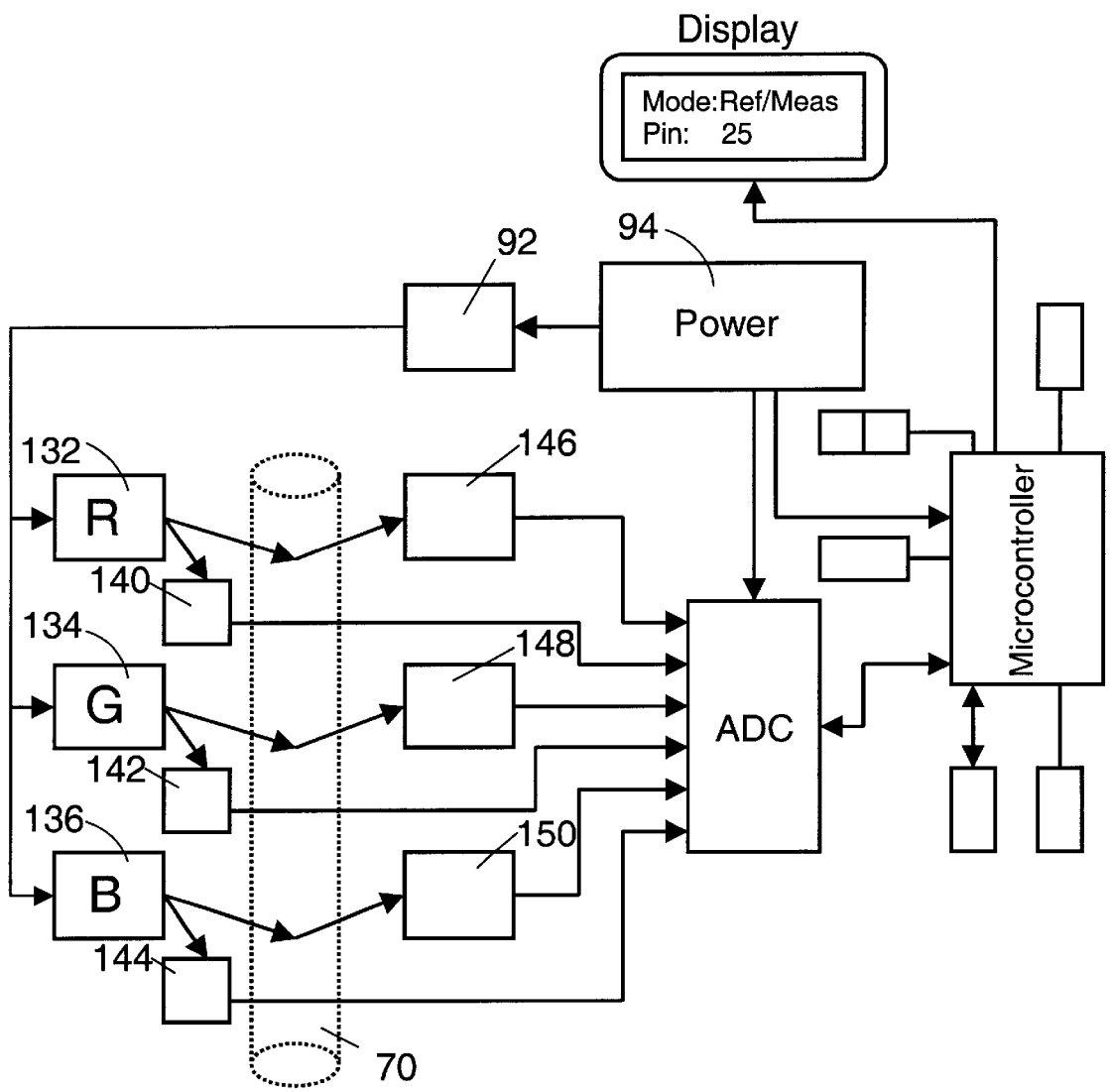
FIG. 9 is an electronic schematic of the cable identifier realizing the method of cable identification presented in FIG. 4B.

An electronic schematic of the second embodiment of the cable identificator is shown in FIG. 9. It realizes the algorithm that is disclosed in FIG. 5 and FIG. 6. Instead of one source of white light, the schematic includes three light sources (132), (134), and (136), each of different color. The light sources are preferably red, green and blue LEDs. The light intensities of each LED is measured by a set of photodetectors (140), (142) and (144). Light reflected from the buffer (70) is measured by three photodetectors (146), (148) and (150). All photodetectors are preferably silicone photodiodes or phototransistors. The schematic operates in sequences measuring signals from each color separately. It preferably operates in a pulse mode when a pulse current is delivered through the driver (92) to the first LED, and the signals from associated measuring and reference photodetectors are registered. Then the next LED is powered, the next pair of the signals is detected and so on. The mode of operation can be chosen by one of ordinary skill in art to optimize the number of pulses and sequencing. If the measuring photodetectors (146), (148) and (150) are separated far enough so each measuring photodetector registers the only light from the associated LED, the signals from photodetectors can be registered simultaneously. However, the total current required would be as three time as higher in order to power all three LEDs simultaneously.

Figure 10A:
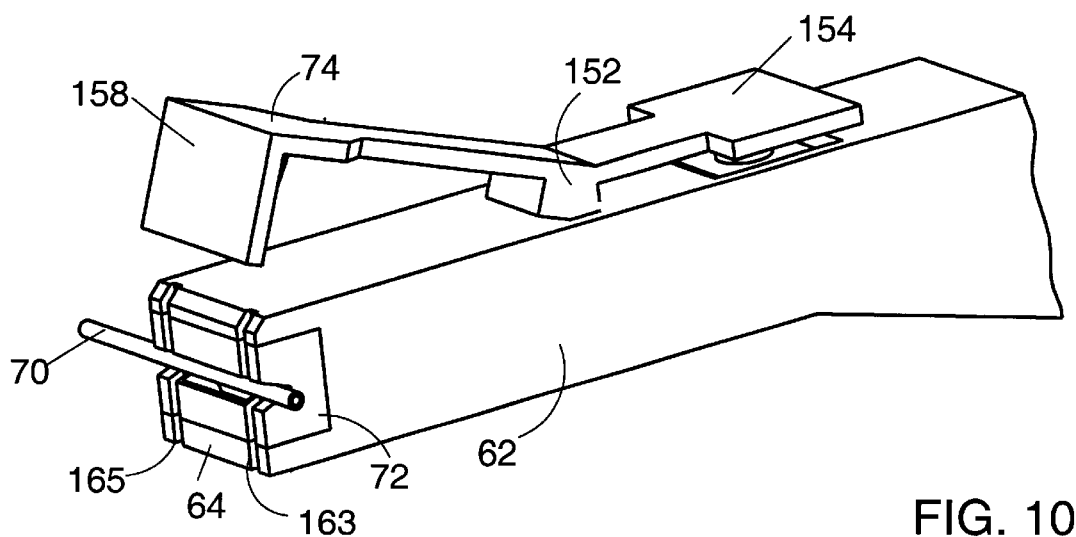
FIG. 10A is an enlarged view of the probe of the cable identifier of FIG. 7 with the opened clamp.
Figure 10B:
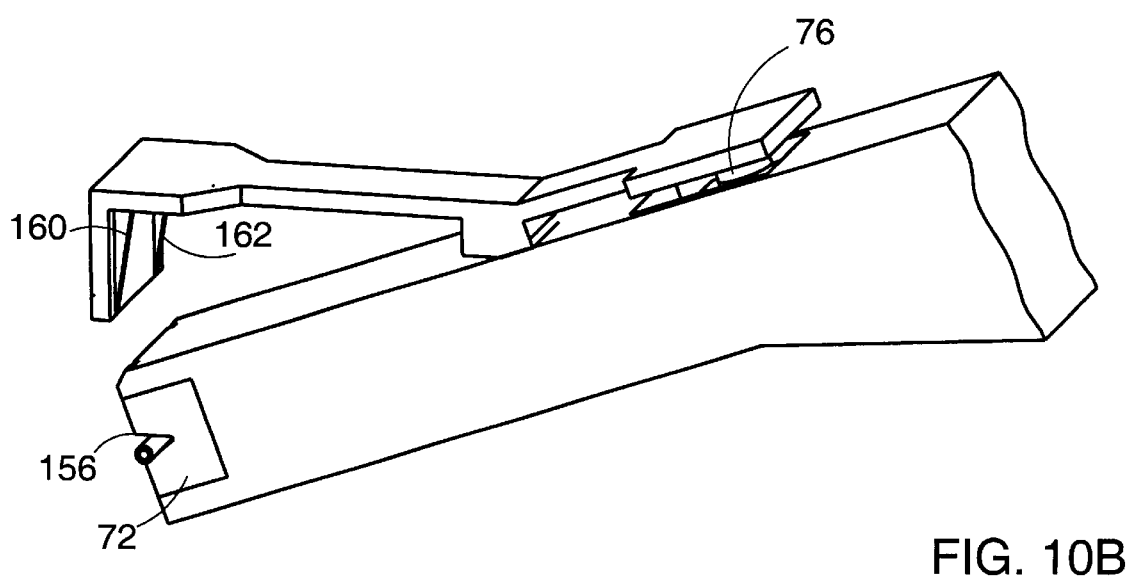
FIG. 10B is another enlarged view of the probe of the cable identifier of FIG. 7 with an opened clamp.
Figure 11:
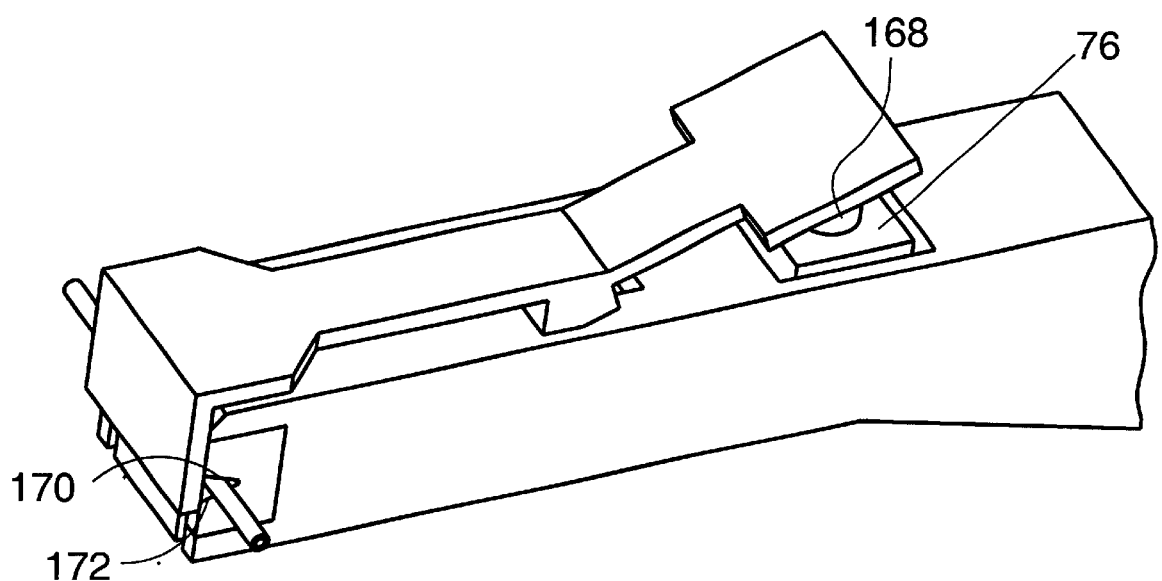
FIG. 11 is an enlarged view of the probe of the cable identifier of FIG. 7 with a released clamp and fixed wire.

For repeatability of reference/loading and measurement procedures the buffer must be steady fixed against light sources and photodetectors. The fixation of the buffer is shown in FIG. 10A and FIG. 10B in greater detail. The clamp (74) can swing in the probe (62) due to hinges (152) when a plate (154) is pressed by the operator. The plate (154) from the bottom is spring loaded by the switch (76). The holder (72) has a channel (156) of V-shaped profile where the buffer (70) is positioned. A holding plate (158) of the clamp has few ribs (160) and (162) that are mated with grooves (163) and (165) on the distal tip (64), correspondingly. The grooves (163) and (165) are extended along the holder (72) as well. When the buffer is placed into the channel (156) and the flat plate (154) is released, the spring of the switch (76) pushes the button (168) and catches the buffer as is shown in FIG. 11. The buffer is fixed in the holder by two sides (170) and (172) of the V-shaped channel and the ribs (160) and (162) (see FIG. 10B). The holding plate (158) screens the buffer from the straight illumination thus reducing the amount of ambient light coming to photodetectors that are located in the holder.

Figure 12A:
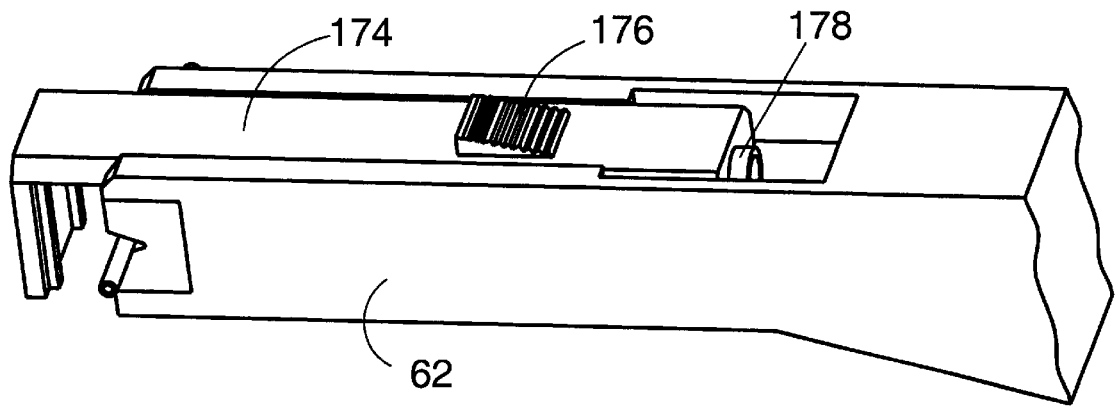
FIG. 12A is an enlarged view of the probe of the cable identifier with an opened sliding clamp.
Figure 12B:
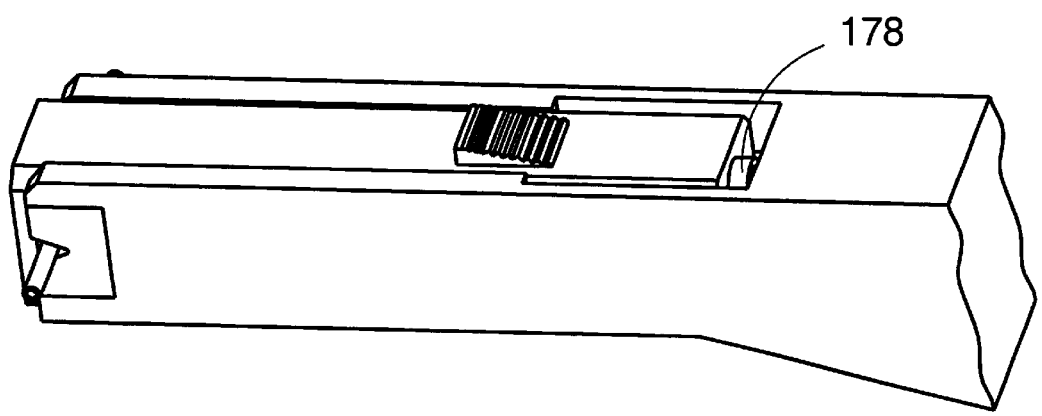
FIG. 12B is an enlarged view of the probe of the cable identifier with a released sliding clamp and fixed wire.

A variety of clams can be realized to hold the buffer by one skilled of the art. A sliding clamp is shown in FIG. 12A and FIG. 12B. A clamp (174) can slide in the probe (62) being pushed forward with a button (176) or backward with a spring-loaded switch (178).

Figure 13:
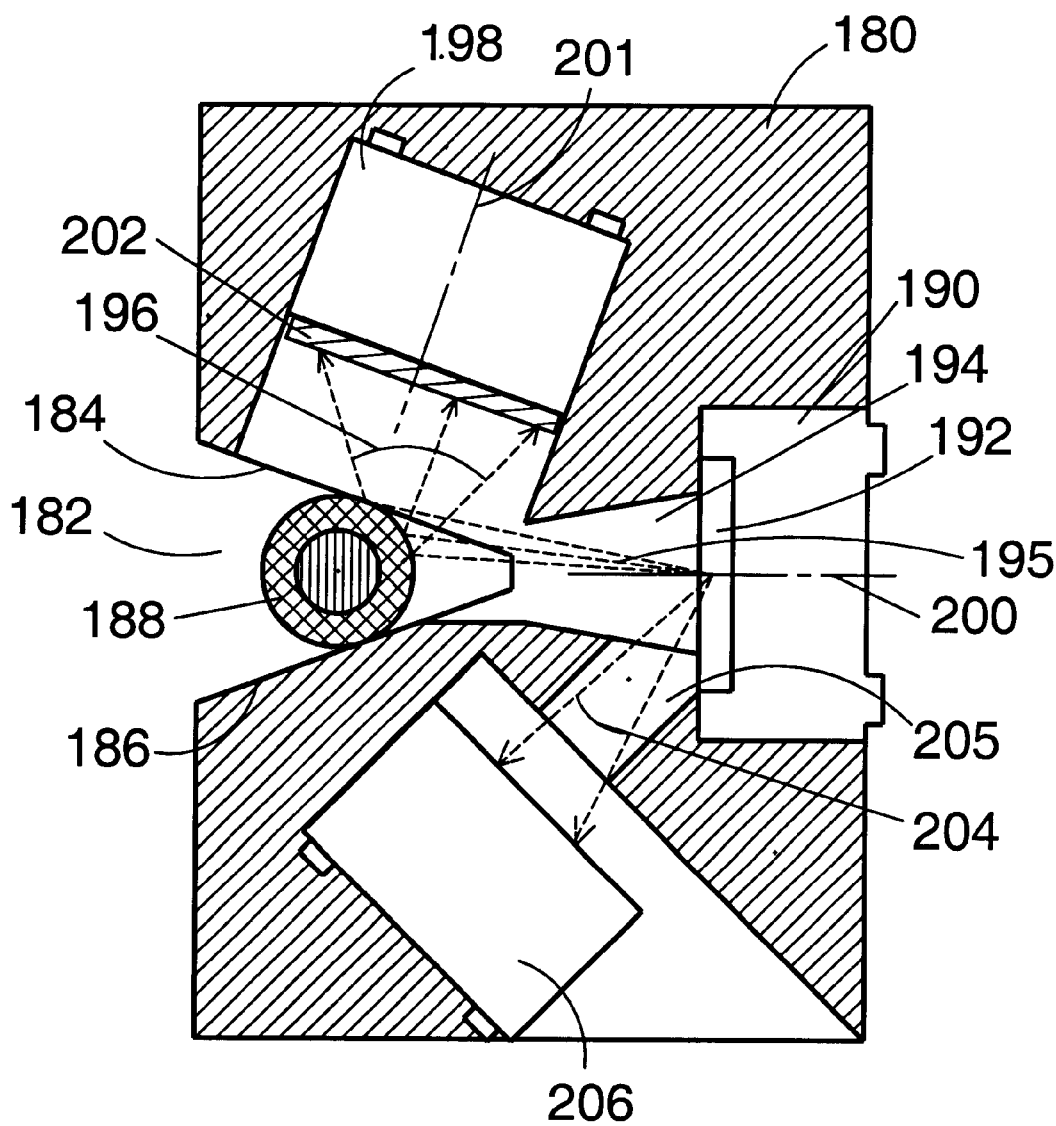
FIG. 13 is a cross section of the holder of the cable of the cable identifier of FIG. 7.

The holder serves for fixing the buffer and mounting the light sources and photodetectors. A cross section of the holder with optoelectronic components inside is shown in FIG. 13. It comprises a base (180) which preferably has rectangular shape. A V-shaped channel (182) is made in the middle of the holder. The depth of the channel is ranged from 2 to 5 mm and the angle between the two opposite sides (184) and (186) of the V-shaped profile is from 30 to 50 degrees. The buffer (188) is placed into the channel (182) until it touches the sides (184) and (186). The geometry above allows the positioning of the typical cable which individual wires or fibers have buffer from 0.5 to 2.0 mm. The scale of the FIG. 13 corresponds to buffer of 0.9 mm that is the most typical buffer in optical fiber communication.

The buffer is illuminated by a light source (190) that is preferably a LED or, more particularly, a surface mount LED. The typical size of the surface mount LED (length× width×height) is about 3.0×2.0×1.0 mm. The light is generated by a p-n junction (192) that is located in the front of the LED. The incident light (195) passes through an illuminating channel (194) in the holder and illuminates the buffer (188). The light (196) reflected from the buffer is collected at a measuring photodetector (198). The angle between the measuring photodetector and the LED that is determined by axes (200) and (201) is ranged from 45 to 90 degrees, preferably from 60 to 80 degrees. A regular color filter (202) (preferably R, G or B filter) can be associated with the measuring photodetector depending on the chosen method, either that is shown in FIG. 1A and FIG. 1B or FIG. 4A and FIG. 4B. Because surface mount LED illuminates the diffuse light, a part (204) of its light passes a reference channel (205) and reaches a reference photodetector (206). The reference photodetector controls the intensity of the incident light that can fluctuate due to the difference between the temperature in the laboratory and in the field. Two similar sets including LED, measuring and reference photodetectors must be mount in parallel in order to get structure shown in FIG. 4B.

Figure 14:
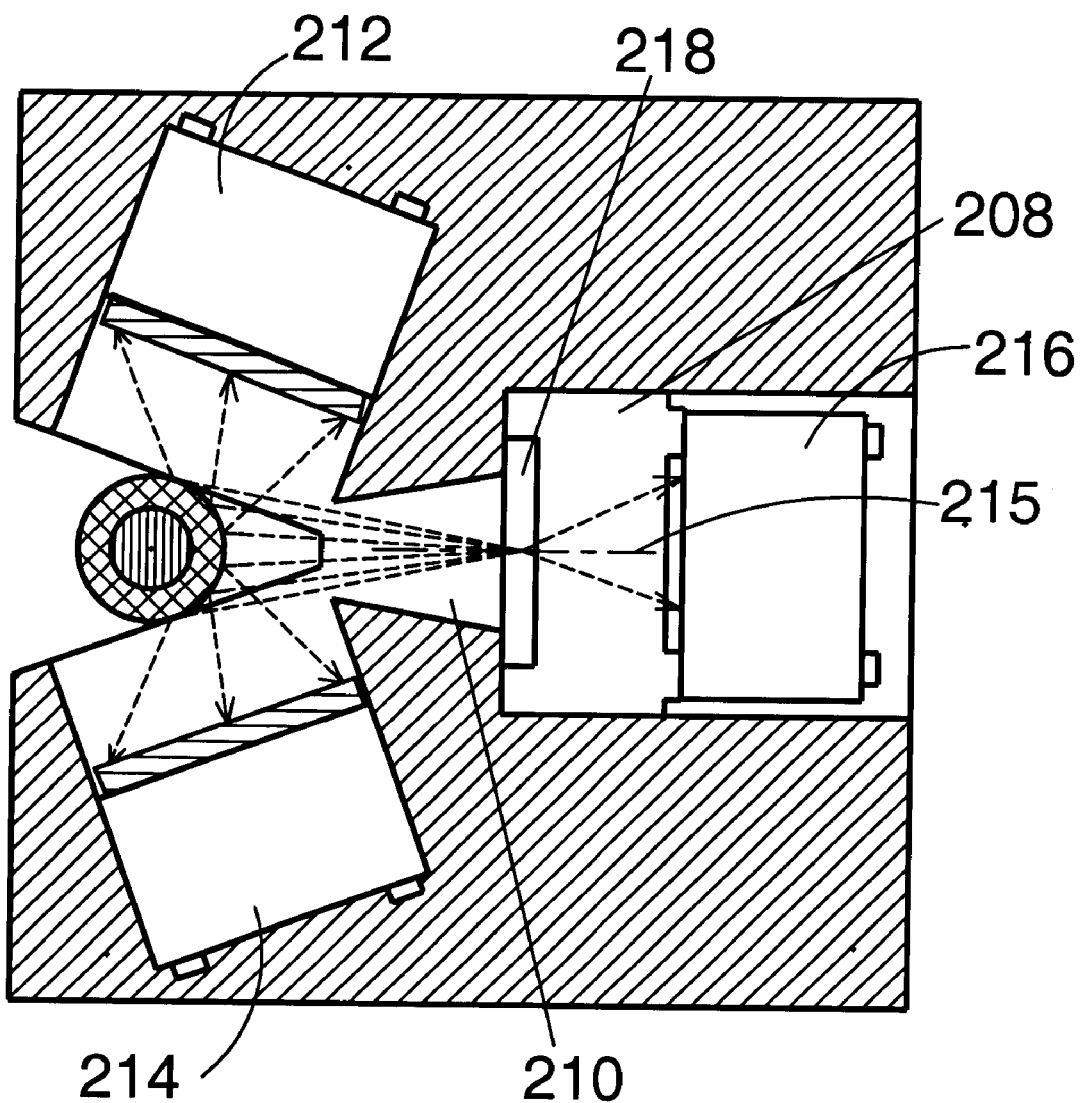
FIG. 14 is a cross section of the second embodiment of the holder of the cable identifier of FIG. 7.

Because surface mount LED generates light in all directions including back, along the axis (200), a more compact design of the holder can be introduced. An example of such compact design is shown in FIG. 14. The light source (208) illuminates the buffer through the illuminating channel (210); and two measuring photodetectors (212) and (214)

collect the light reflected at two sides from the buffer. The measuring photodetectors are preferably located symmetrically along the axis (215) of the LED under the same angle from 45 to 90 degrees, preferably from 60 to 80 degrees. A reference photodetector (216) is located at the opposite side of the LED. It controls the light intensity by measuring the amount of light that is generated by the p-n junction (218) and passed through the ceramic enclosure (208) of the LED. A third measuring photodetector (not shown) is located in parallel to one of the photodetectors (198) or (206).

Although the present invention has been described in some detail by way of example for purposes of clarity and understanding, it will be apparent that certain changes and modifications may be practiced within the scope of the appended claims.

What is claimed is:

1. A method for identification of a wire or a fiber in a multi-wire or multi-fiber cable comprising the steps of:
   striping an end of said cable into individual wires or fibers;
   applying to a buffer of said wire or fiber a portable hand-held device comprising:
      a body containing:
         a probe located at a distal end of said body;
         a holder with a V-shaped groove attached to a distal end of said probe;
         a polychromatic white light source illuminating said buffer through said V-shaped groove of said holder;
         a plurality of photodetectors associated with color filters;
         a signal processing means;
         a power supply;
         a spring-loaded clamp steady fixing said buffer in said V-shaped groove of said holder;
         a switch associated with said clamp;
         a display indicating mode status and identification symbol of said buffer;
   measuring color parameters of said buffer;
   comparing measured color parameters with reference color parameters stored in a memory of said signal processing means;
   selecting an identification symbol of said buffer as one that have the same measured and reference color parameters;
   displaying said identification symbol on said display.

2. A method as in claim 1 further comprising the steps of:
   measuring dark color parameters of said buffer created by an ambient illumination;
   measuring light color parameters of said buffer created by said light sources and ambient illumination;
   calculating measured color parameters as differences between said color and dark parameters;
   comparing measured color parameters with reference color parameters stored in a memory of said signal processing means;
   selecting an identification symbol of said buffer as one that have the same measured and reference color parameters;
   displaying said identification symbol on said display.

3. A method for identification of a wire or a fiber in a multi-wire or multi-fiber cable comprising the steps of:
   striping an end of said cable into individual wires or fibers;
   applying to a buffer of said wire or fiber a portable hand-held device comprising:
      a body containing:
         a probe located at a distal end of said body;
         a holder with a V-shaped groove attached to a distal end of said probe;
         a plurality of light sources having different colors and illuminating said buffer through said V-shaped groove of said holder;
         at least one photodetector;
         a signal processing means;
         a power supply;
         a spring-loaded clamp steady fixing said buffer in said V-shaped groove of said holder;
         a switch associated with said clamp;
         a display indicating mode status and identification symbol of said buffer;
   measuring color parameters of said buffer;
   comparing measured color parameters with reference color parameters stored in a memory of said signal processing means;
   selecting an identification symbol of said buffer as one that have the same measured and reference color parameters;
   displaying said identification symbol on said display.

4. A method as in claim 3 further comprising the steps of:
   measuring dark color parameters of said buffer created by an ambient illumination;
   measuring light color parameters of said buffer created by said light sources and ambient illumination;
   calculating measured color parameters as differences between said color and dark parameters;
   a comparing measured color parameters with reference color parameters stored in a memory of said signal processing means;
   selecting an identification symbol of said buffer as one that have the same measured and reference color parameters;
   displaying said identification symbol on said display.

5. An apparatus for identification of a wire or a fiber in a multi-wire or multi-fiber cable by measuring color of the buffer of said wire or fiber, comprising
   a hand-held body containing:
      a probe located at a distal end of said body;
      a holder with a V-shaped groove attached to a distal end of said probe;
      a polychromatic white light source illuminating said buffer through said V-shaped groove of said holder;
      a plurality of photodetectors associated with color filters, said photodetectors measuring light reflected from said buffer;
      at least one reference photodetector controlling intensity of said white light source;
      a signal processing means;
      a power supply;
      a spring-loaded clamp steady fixing said buffer in said V-shaped groove of said holder;
      a switch associated with said clamp;
      a display indicating mode status and identification symbol of said buffer.

6. An apparatus as in claim 5 wherein said polychromatic light source is a white LED.

7. An apparatus as in claim 5 wherein said color filters are primary R, G and B filters.

8. An apparatus as in claim 5 wherein said processing means include a microcontroller and a memory.

9. An apparatus as in claim 5 wherein said display is a liquid crystal display.

10. An apparatus as in claim 8 wherein said microcontroller is programmed to measure and store sets of signals from said photodetectors:
   dark signals created by ambient illumination;
   light signals created by said light source and ambient illumination;
   measured signals as differences between said light and dark signals;
   normalized signals as said measured signals related to signal from said reference photodetector.

11. An apparatus as in claim 10 wherein said microcontroller is programmed to compare said measured signals with reference signals that are stored in said memory.

12. An apparatus as in claim 11 wherein said reference signals are loaded into said memory after measuring the buffer with known identification symbol.

13. An apparatus as in claim 12 wherein said reference signals are RGB color parameters.

14. An apparatus as in claim 12 wherein said identification symbol is a pin number where said wire or fiber must be connected.

15. An apparatus for identification of a wire or a fiber in a multi-wire or multi-fiber cable by measuring color of the buffer of said wire or fiber, comprising
   a hand-held body containing:
      a probe located at a distal end of said body;
      a holder with a V-shaped groove attached to a distal end of said probe;
      a plurality of light sources having different colors and illuminating said buffer through said V-shaped groove of said holder;
      at least one photodetector measuring light reflected from said buffer;
      at plurality of reference photodetectors controlling intensity of said light sources;
      a signal processing means;
      a power supply;
      a spring-loaded clamp steady fixing said buffer in said V-shaped groove of said holder;
      a switch associated with said clamp;
      a display indicating mode status and identification symbol of said buffers.

16. An apparatus as in claim 15 wherein said light sources are red, green and blue LED.

17. An apparatus as in claim 15 wherein said processing means include a microcontroller and a memory.

18. An apparatus as in claim 15 wherein said display is a liquid crystal display.

19. An apparatus as in claim 17 wherein said microcontroller is programmed to measure and store sets of signals from said measuring photodetector:
   dark signals created by ambient illumination;
   light signals created by said light source and ambient illumination;
   measured signals as differences between said light and dark signals;
   normalized signals as said measured signals related to signal from said reference photodetectors.

20. An apparatus as in claim 19 wherein said microcontroller is programmed to compare said measured signals with reference signals that are stored in said memory.

21. An apparatus as in claim 19 wherein said reference signals are loaded into said memory after measuring the buffer with known identification symbol.

22. An apparatus as in claim 21 wherein said identification symbol is a pin number where said wire or fiber must be connected.

* * * * *